United States Patent
Sharma et al.

(10) Patent No.: US 10,848,379 B2
(45) Date of Patent: Nov. 24, 2020

(54) CONFIGURATION OPTIONS FOR CLOUD ENVIRONMENTS

(71) Applicant: HEWLETT PACKARD ENTERPRISE DEVELOPMENT LP, Houston, TX (US)

(72) Inventors: Puneet Sharma, Palo Alto, CA (US); Ali Munir, East Lansing, MI (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 1 day.

(21) Appl. No.: 16/261,743

(22) Filed: Jan. 30, 2019

(65) Prior Publication Data
US 2020/0244527 A1    Jul. 30, 2020

(51) Int. Cl.
| | |
|---|---|
| *G06F 15/16* | (2006.01) |
| *H04L 12/24* | (2006.01) |
| *G06N 20/00* | (2019.01) |
| *H04L 29/08* | (2006.01) |
| *H04L 12/26* | (2006.01) |
| *H04L 12/911* | (2013.01) |

(52) U.S. Cl.
CPC ......... *H04L 41/0816* (2013.01); *G06N 20/00* (2019.01); *H04L 43/08* (2013.01); *H04L 47/82* (2013.01); *H04L 67/10* (2013.01)

(58) Field of Classification Search
CPC ..... H04L 41/0816; H04L 43/08; H04L 47/82; H04L 67/10; G06N 20/00
USPC ........................................................ 709/221
See application file for complete search history.

(56) References Cited

U.S. PATENT DOCUMENTS

| | | |
|---|---|---|
| 8,099,720 B2 | 1/2012 | Sedukhin et al. |
| 8,161,479 B2 | 4/2012 | Sedukhin et al. |
| 9,495,211 B1 | 11/2016 | Helstroom et al. |

(Continued)

OTHER PUBLICATIONS

Alipourfard et al., CherryPick: Adaptively Unearthing the Best Cloud Configurations for Big Data Analytics, 14th USENIX Symposium on Networked Systems Design and Implementation (NSDI '17), Mar. 2017 (15 pages).

(Continued)

*Primary Examiner* — Melvin H Pollack
(74) *Attorney, Agent, or Firm* — Jaffery Watson Mendonsa & Hamilton

(57) ABSTRACT

In some examples, a system receives input information for an application, the input information comprising a specification of a performance parameter relating to the application, and information of an arrangement of components of the application. The system generates, based on the input specification of the parameter and the information of the arrangement of components of the application, a plurality of configuration options representing respective different sets of resources, where a first set of resources of the different sets of resources includes resources of a plurality of cloud environments from different cloud providers. The system selects, based on a target goal, a configuration option of the plurality of configuration options, and output deployment information to cause deployment of the selected configuration option. The system adjusts an allocation of resources to the application responsive to performance metrics from a performance monitor that monitors performance of the application after the deployment.

20 Claims, 5 Drawing Sheets

(56) References Cited

U.S. PATENT DOCUMENTS

| | | | |
|---|---|---|---|
| 9,882,833 B2 | 1/2018 | McBride et al. | |
| 10,191,778 B1* | 1/2019 | Yang | G06F 9/45558 |
| 10,205,771 B2* | 2/2019 | Palavalli | H04L 67/10 |
| 10,218,803 B2* | 2/2019 | Ameling | G06F 8/30 |
| 10,225,323 B2* | 3/2019 | Revanuru | H04L 67/10 |
| 10,235,263 B2* | 3/2019 | Megahed | G06F 11/00 |
| 10,250,451 B1* | 4/2019 | Moghe | H04L 41/145 |
| 10,284,636 B2* | 5/2019 | Stelmar Netto | G06F 9/46 |
| 10,341,250 B2* | 7/2019 | Caminiti | H04L 67/2838 |
| 10,346,775 B1* | 7/2019 | Xu | G06Q 20/145 |
| 10,355,913 B2* | 7/2019 | Dang | H04L 41/5009 |
| 10,367,701 B2* | 7/2019 | Nadaf | H04L 41/5054 |
| 10,382,291 B2* | 8/2019 | Subramani Nadar | H04L 41/5045 |
| 10,387,129 B2* | 8/2019 | Schmidt | G06F 8/60 |
| 10,389,586 B2* | 8/2019 | Hockett | H04L 67/30 |
| 10,482,407 B2* | 11/2019 | Tijerina | G06N 3/08 |
| 10,484,341 B1* | 11/2019 | Todd | G06F 8/34 |
| 10,489,126 B2* | 11/2019 | Kumar | G06K 9/6269 |
| 10,496,605 B2* | 12/2019 | Melnik | G06F 16/16 |
| 10,534,337 B2* | 1/2020 | Tucker | G05B 19/048 |
| 10,536,356 B2* | 1/2020 | Zhong | H04L 41/12 |
| 10,552,221 B2* | 2/2020 | Olshefski | G06Q 10/06315 |
| 10,554,740 B2* | 2/2020 | Bailey | H04L 67/1025 |
| 10,565,329 B2* | 2/2020 | Greenwood | G06F 17/00 |
| 10,693,704 B2* | 6/2020 | Raymond | H04L 41/044 |
| 2014/0280805 A1 | 9/2014 | Sawalha | |
| 2019/0102415 A1* | 4/2019 | Bishnoi | G06F 16/2282 |
| 2019/0199597 A1* | 6/2019 | Valisammagari | H04L 41/22 |
| 2019/0312800 A1* | 10/2019 | Schibler | H04L 41/0823 |
| 2019/0312946 A1* | 10/2019 | Chefalas | H04L 63/00 |
| 2019/0361697 A1* | 11/2019 | Hu | G06F 8/433 |
| 2020/0012509 A1* | 1/2020 | Khan | G06F 9/5077 |
| 2020/0034206 A1* | 1/2020 | Dimitrov | G06F 9/5077 |
| 2020/0052957 A1* | 2/2020 | Tubillara | H04L 67/10 |
| 2020/0059420 A1* | 2/2020 | Abraham | G06F 9/5072 |
| 2020/0073717 A1* | 3/2020 | Hari | G06F 9/5061 |
| 2020/0089518 A1* | 3/2020 | Beyer | G06F 9/5077 |
| 2020/0090087 A1* | 3/2020 | Singh | G06Q 10/06316 |
| 2020/0090172 A1* | 3/2020 | Zhang | G06F 8/63 |
| 2020/0092391 A1* | 3/2020 | Poydence | H04L 67/2852 |
| 2020/0106711 A1* | 4/2020 | Sok | H04L 47/70 |

OTHER PUBLICATIONS

Attardi, G. et al.; "Declarative Modeling for Building a Cloud Federation and Cloud Applications"; Jun. 16, 2017; 23 pages.

Dadgar, Armon, HashiCorp Nomad, Sep. 2015 (11 pages).

Google Cloud, Knative downloaded Jan. 19, 2019 (13 pages).

Liu, Changbin et al., Cologne: A Declarative Distributed Constraint Optimization Platform, Proceedings of the VLDB Endowment, vol. 5, No. 8, Aug. 2012 (12 pages).

Liu, Changbin et al., Declarative Automated Cloud Resource Orchestration, University of Pennsylvania, ScholarlyCommons, Oct. 2011 (10 pages).

The Linux Foundation, What is Kubernetes? last modified Nov. 29, 2018 (9 pages).

Wiki Openstack.org, OpenStack Orchestration, Heat, Retrieved from "https://wiki.openstack.org/w/index.php?title=Heat&oldid=162872" dated on or before Jan. 19, 2019 (10 pages).

Wikipedia, Apache Mesos last edited Dec. 24, 2018 (4 pages).

Wikipedia, Terraform (software) last edited Jan. 3, 2019 (2 page).

Consul, "Service Mesh Made Easy", Jan. 28, 2019, available online at <https://web.archive.org/web/20190128032832/https://www.consul.io/>, 9 pages.

HashiCorp Nomad, "Simple and Lightweight", available online at <https://web.archive.org/web/20190128103615/https://www.nomadproject.io/>, retrieved on Jan. 28, 2019, 10 pages.

HashiCorp, "Terraform: Write, Plan, and Create Infrastructure as Code", available online at <https://web.archive.org/web/20190129025428/https://www.terraform.io/>, retrieved on Jan. 29, 2019, 9 pages.

Jay McCarthy, "Datalog: Deductive Database Programming", Nov. 22, 2018, available online at <https://web.archive.org/web/20181122140138/https://docs.racket-lang.org/datalog/>, 1 page.

Kubernetes, "Production-Grade Container Orchestration", Jan. 29, 2019, available online at <https://web.archive.org/web/20190129002432/https://kubernetes.io/>, 8 pages.

Mesosphere, "Automate hybrid cloud infrastructures to power IoT and data-driven applications", Jan. 28, 2019, available online at <https://web.archive.org/web/20190128034402/https://mesosphere.com/>, 4 pages.

Openstack, "Build the future of Open Infrastructure" Jan. 29, 2019, available online at <https://web.archive.org/web/20190129000055/https://www.openstack.org/>, 8 pages.

* cited by examiner

CONFIGURATION OPTIONS FOR CLOUD ENVIRONMENTS

BACKGROUND

Enterprises or individuals have been increasingly deploying their large-scale distributed applications on clouds, which include public clouds, private clouds, hybrid clouds, and so forth. A cloud includes resources that tenants of the cloud can use to implement an application.

BRIEF DESCRIPTION OF THE DRAWINGS

Some implementations of the present disclosure are described with respect to the following figures.

Figure 1:
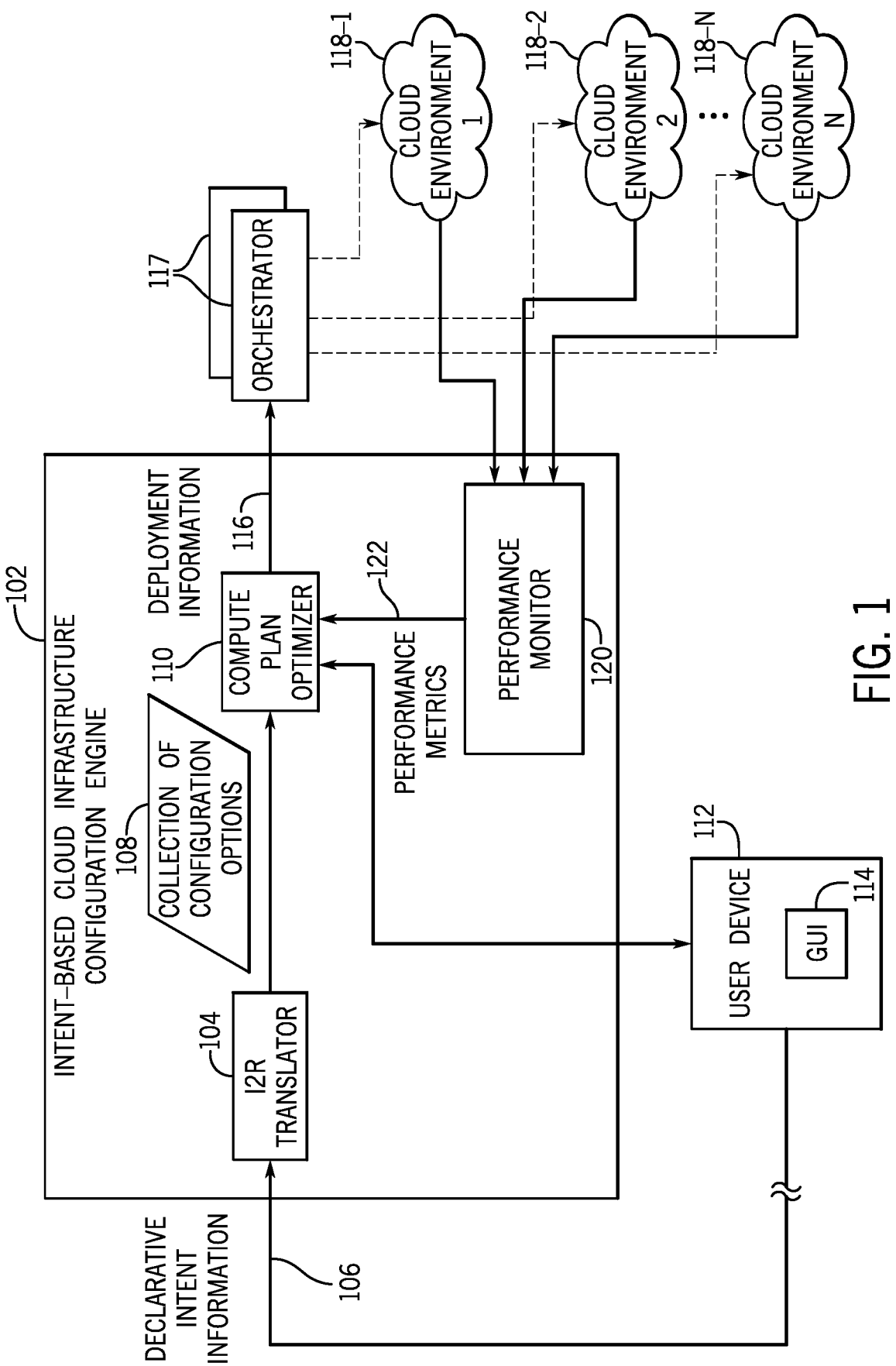
FIG. 1 is a block diagram of an arrangement that includes an intent-based cloud infrastructure configuration engine, according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

Managing deployment of an application across multiple cloud environments can be challenging. An "application" can refer to a workload, a service, or any collection of tasks. A "cloud environment" (or more simply, a "cloud") can refer to a collection of resources and services that a tenant (a user, an enterprise, a machine, a program, etc.) can use for deploying an application. A cloud environment can include a computing platform or multiple computing platforms, where a "computing platform" can refer to a collection of resources, including any or some combination of processing resources, storage resources, network resources, virtual resources, database resources, programs, and so forth. Different cloud environments can be provided by different cloud providers, which are entities that manage and offer respective resources of corresponding cloud environments for use by tenants of the cloud environments. A cloud environment can include a public cloud (which is available over a public network such as the Internet to tenants), a private cloud (which is available to a particular group of tenants), a hybrid cloud (which includes a mixture of different clouds), and so forth.

Managing deployment of applications across cloud environments while satisfying performance goals and/or reducing costs and/or satisfying other goals of the deployment can be challenging. In some examples, tenants manually specify resources of a cloud environment to use for deploying an application. Manually specifying resources for an application can be time-consuming and error prone. Additionally, after deployment of an application, changing conditions or changing performance specifications may mean that an allocated set of cloud resources may no longer be satisfactory. Moreover, tenants may be restricted to deploying an application on a cloud environment of a single cloud provider, which reduces flexibility.

In accordance with some implementations of the present disclosure, an intent-based cloud infrastructure configuration engine is able to automate the deployment, performance monitoring, and scaling of an application in a cloud environment based on the changes in incident workload and/or underlying infrastructure changes. In some cases, the intent-based cloud infrastructure configuration engine is able to deploy, monitor, and scale a distributed application across multiple cloud environments. The intent-based cloud infrastructure configuration engine receives, through a user interface, input information (relating to an application) in a generic declarative form that can flexibly be used with different types of applications and/or cloud environments of different cloud providers. The input information can be received from a user (such as an application administrator or other user) or another entity.

A "cloud provider" can refer to an entity that manages a cloud and that offers resources and services that are accessible by tenants of the cloud. A tenant can refer to a human user, an enterprise (e.g., a business concern, a government agency, an educational organization, etc.), a machine, or a program (that includes machine-readable instructions).

The input information that expresses a high-level declarative intent can specify components of the application and performance and operational specifications for the application or each component of the application. Based on the input information, the intent-based cloud infrastructure configuration engine generates multiple configuration options (also referred to as "deployment plans") representing respective different sets of available resources, where a set of resources can include resources of multiple cloud environments from different cloud providers. The intent-based cloud infrastructure configuration engine selects, based on a target goal, a configuration option of the multiple configuration options, and outputs deployment information (such as in the form of deployment commands, configuration files, etc.) to cause deployment of the application using the resources of the selected configuration option. After deployment of the application using the selected configuration option, the intent-based cloud infrastructure configuration engine is able to adjust an allocation of resources to the application responsive to performance metrics from a performance monitor that monitors performance of the application after the deployment.

As used here, an "engine" can refer to a hardware processing circuit, which can include any or some combination of a microprocessor, a core of a multi-core microprocessor, a microcontroller, a programmable integrated circuit, a programmable gate array, a digital signal processor, or another hardware processing circuit. Alternatively, an "engine" can refer to a combination of a hardware processing circuit and machine-readable instructions (software and/or firmware) executable on the hardware processing circuit.

As shown in FIG. 1, the intent-based cloud infrastructure configuration engine 102 includes an intent-to-resource (I2R) translator 104 that receives declarative intent information 106. In some examples, the declarative intent information 106 is received from a user device 112, which can include a desktop computer, a notebook computer, a tablet computer, a smartphone, or any other type of electronic device that a user can use to access the intent-based cloud infrastructure configuration engine 102. The user device 112 can be coupled to the intent-based cloud infrastructure configuration engine 102 over a network, such as the Internet, a local area network (LAN), a wide area network (WAN), a wireless network, and so forth.

The user device 112 has or is coupled to a display device to display a graphical user interface (GUI) 114, which allows a user of the user device 112 to enter information to produce the declarative intent information 106. In other examples, the declarative intent information 106 can be provided by another entity, such as a machine or program.

The I2R translator 104 generates, based on the declarative intent information 106, and possibly other information (discussed further below), a collection of configuration options 108.

The collection of configuration options 108 (which can also be referred to as an application model or application profile) is received by a compute plan optimizer (CPO) 110. In some examples, the CPO 110 can communicate with the user device 112, and can cause the collection of configuration options 108 to be presented in the GUI 114 of the user device 112. Presenting the configuration options 108 to the user of the user device 112 allows the user to select or rank the configuration options. In other examples, the configuration options 108 are not presented to the user. Instead, the CPO 110 is able to select one of the configuration options based on a target goal.

More generally, the CPO 110 is able to select a configuration option from the collection of configuration options 108, based on user input and/or the target goal. For the selected configuration option, the CPO 110 outputs deployment information 116, which can be in the form of configuration files for configuring resources of multiple cloud environments 118-1, 118-2, and 118-N, where N 2.

As shown in the example of FIG. 1, the deployment information 116 is provided to a set of orchestrators 117, where the set of orchestrators 117 can include just one orchestrator or multiple orchestrators. Examples of orchestrators can include any or some combination of the following: a Kubernetes orchestrator, an Openstack orchestrator, an Apache Mesos orchestrator, a Terraform orchestrator, a Nomad orchestrator, a Knative orchestrator, and so forth. Given the deployment information 116 (which can specify the resources to be used for a workload of an application), an orchestrator is able to configure and provision resources of a cloud environment (or multiple cloud environments) according to the information pertaining to the resources included in the deployment information 116. Different types of orchestrators can use different forms of the deployment information 116. The CPO 110 is able to produce the deployment information 116 in the respective form for each of the orchestrators 117 involved in deploying the application on the cloud environments 118-1 to 118-N. In some examples, multiple orchestrators 117 can be used with multiple cloud environments 118-1 to 118-N of different cloud providers. In other examples, one orchestrator 117 may be used to deploy the workload of the application across multiple cloud environments.

In some examples, the intent-based cloud infrastructure configuration engine 102 also includes a performance monitor 120, which can monitor performance of the application deployed on the resources of the cloud environments 118-1 to 118-N. Based on the monitored performance, the performance monitor 120 can provide performance metrics 122 to the CPO 110. Based on performance metrics 122 provided by the performance monitor 120, the CPO 110 can adjust an allocation of resources of a cloud environment (or multiple cloud environments) for the application.

The I2R translator 104, the CPO 110, and the performance monitor 120 can each be implemented as a portion of the hardware processing circuit of the intent-based cloud infrastructure configuration engine 102. Alternatively, the I2R translator 104, the CPO 110, and the performance monitor 120 can be implemented as machine-readable instructions executable on the intent-based cloud infrastructure configuration engine 102.

In further examples, although the performance monitor 120 is depicted in FIG. 1 as being part of the intent-based cloud infrastructure configuration engine 102, the performance monitor 120 can alternatively include respective monitoring agents executing in the respective cloud environments 118-1 to 118-N.

Figure 2:
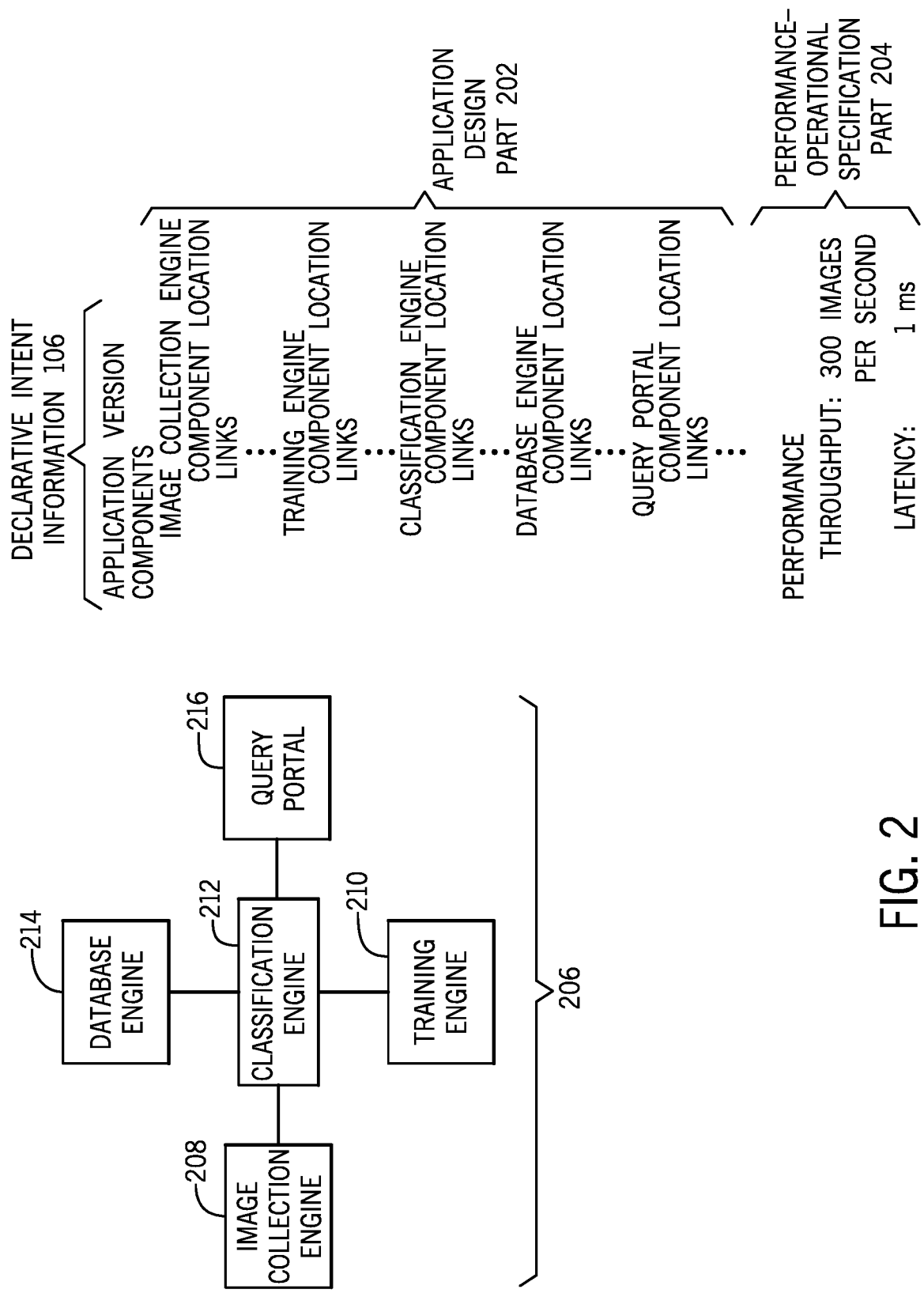
FIG. 2 illustrates declarative intent information, according to some examples.

FIG. 2 shows an example of the declarative intent information 106. The declarative intent information 106 includes an application design part 202 and a performance-operational specification part 204.

The application design part 202 defines the components of the application, configuration specific details of the components, and how the components are linked to one another, as well as other information. The performance-operational specification part 204 includes information specifying a target performance level (or multiple target performance levels) of the application, and/or an operational specification (e.g., the application or a certain component of the application is to be deployed on a certain type of cloud environment).

The declarative intent information 106 can be in the form of a text document. In other examples, the declarative intent information 106 can be in other formats, such as a markup language format, e.g., eXtensible Markup Language (XML), etc.

In the example of FIG. 2, the example application represented by application design part 202 is a learning-based image analytics application for analyzing images. The application includes the following components (also shown as an interconnected arrangement 206 of components in FIG. 2): an image collection engine 208, a training engine 210, a classification engine 212, a database engine 214, and a query portal 217. The image collection engine 208 collects labeled images that are labeled with respect to a class or multiple classes. The training engine 210 uses the labeled images to train a learning model used by the classification engine 212. The classification engine 212 receives an image from the query portal 216 as the input, and outputs a classification answer regarding whether the image is positive or negative with respect to a class. The classification engine 212 can return the classification answer to the query portal 216, and can also store the input query image and the classification answer in a result database using the database engine 214.

The application design part 202 of the declarative intent information 106 includes information relating to each of the components (208, 210, 212, 214, and 216) of the application.

The information of the components can include a component location that identifies a path of the code image for the component to load or start upon startup of the application, link information that specifies dependence/relationship between the component and other component(s), and other information (e.g., what ports to use, environment variables to set up, a storage volume to mount, etc.).

Examples of performance specifications included in the performance performance-operational part 204 of the declarative intent information 106 includes a throughput specification (e.g., a target number of images to be processed per unit time by the application), and a latency specification (indicating an amount of latency that is acceptable in processing performed by the application). In other examples, other performance specifications can be expressed by the performance specification part 204. A performance specification can relate to an operation of the application (e.g., number of images that can be processed by the application, etc.). Alternatively, a performance specification can relate to network operation for the application, such as a number of packets per unit time that can be exchanged over a network by the application, a latency in communication experienced by the application, and so forth. A performance specification can include the following elements in some examples: a component, an attribute, a literal, and a value Note that each performance specification included in the performance-operational part 204 of the declarative intent information 106 can be for the overall application, or for a component (or subset of components) of the application. Thus, for example, the performance-operational part 204 can include a first performance specification for a first application component (or a first subset of application components), a second performance specification for a second application component (or a second subset of application components), and so forth.

Although not depicted in the example of FIG. 2, the performance-operational part 204 can also include an operational specification, which can specify that the application or a component of the application (or subset of application components) is to be deployed on a certain type of cloud environment.

In some examples of the present disclosure, the declarative intent information 106 is expressed using a comprehensive and extensible declarative intent language that can be used to describe the deployment intent for multiple applications that are to be deployed in multiple cloud environments. The declarative intent language is able to specify different performance-operational specifications of different applications. For example, for a first application, performance specifications such as throughput or latency can be specified. For a second application, a different set of performance specifications can be specified. For a third application, an operational specification can indicate that the application (or a component of the application) is to run on a specific type of cloud environment (e.g., Amazon Web Services).

The declarative intent language is extensible to support new cloud environments and applications that may be associated with different performance or operational specifications.

In some examples, the compute plan optimizer 110 can generate, based on the declarative intent information 106, performance policies, which includes performance constraints on resources. A performance policy can describe which states of the application are permitted after deployment and which states are not. As another example, a performance policy can describe what actions to take in each state of the application, in order to transition the application to one of those permitted states.

In more specific examples, the intent-based cloud infrastructure configuration engine 102 uses Datalog as a policy language for a performance policy. Datalog is a declarative language.

As an example, according to the Datalog, the declarative intent information 106 can include the following input: instance, attribute, literal, value, action. "Instance" represents the application component for which the intent is specified; the instance can be the application name or the name of a specific application component that is to be monitored. "Attribute" represents the metric or parameter that an application administrator wants to monitor and maintain once an application has been deployed. "Literal" defines the allowed operational constraints for the application attribute. The operational constraints define the allowable states of the application component. A literal can be used to express an intent. For example, a literal "lt(x, y)" can evaluate to true if x<y, a literal "lteq(x, y)" can evaluate to true if x≤y, a literal "gt(x, y)" can evaluate to true if x>y, a literal "max(x, y, z)" computes z=max(x, y), and so forth.

"Value determines a desired operating value ("y" in the foregoing examples) of the application attribute.

"Action" represents an event that takes place in case of a violation or if a rule is satisfied. Examples of actions include scale up a resource (e.g., increase the amount of resource allocated to an application component), scale down a resource (decrease an amount of resource allocated to the application component), and terminate (stop the application component).

Based on the foregoing input, an output performance policy can be produced, where the performance policy can specify an action, such as to scale up a resource, if a rule is satisfied (e.g., performance metrics satisfy a criterion). The intent-based cloud infrastructure configuration engine 102 can save the performance policy information in Datalog tables, and the intent-based cloud infrastructure configuration engine 102 can continually compare the performance metrics obtained from the cloud environments 118-1 to 118-N to determine if an action of the performance policy is to be performed. The intent-based cloud infrastructure configuration engine 102 can raise triggers in response to the performance policy expressed in a Datalog table. The Datalog table is an example of a declarative database that can store a performance policy for triggering an action in response to performance metrics satisfying a rule of the performance policy. A performance policy can specify performance requirements for individual application components, and/or end-to-end performance requirements of the overall application. For example, if the performance policy specifies that a response time of an application should be less than X milliseconds, the X milliseconds can be spread across the multiple application components of the application in some way.

Figure 3:
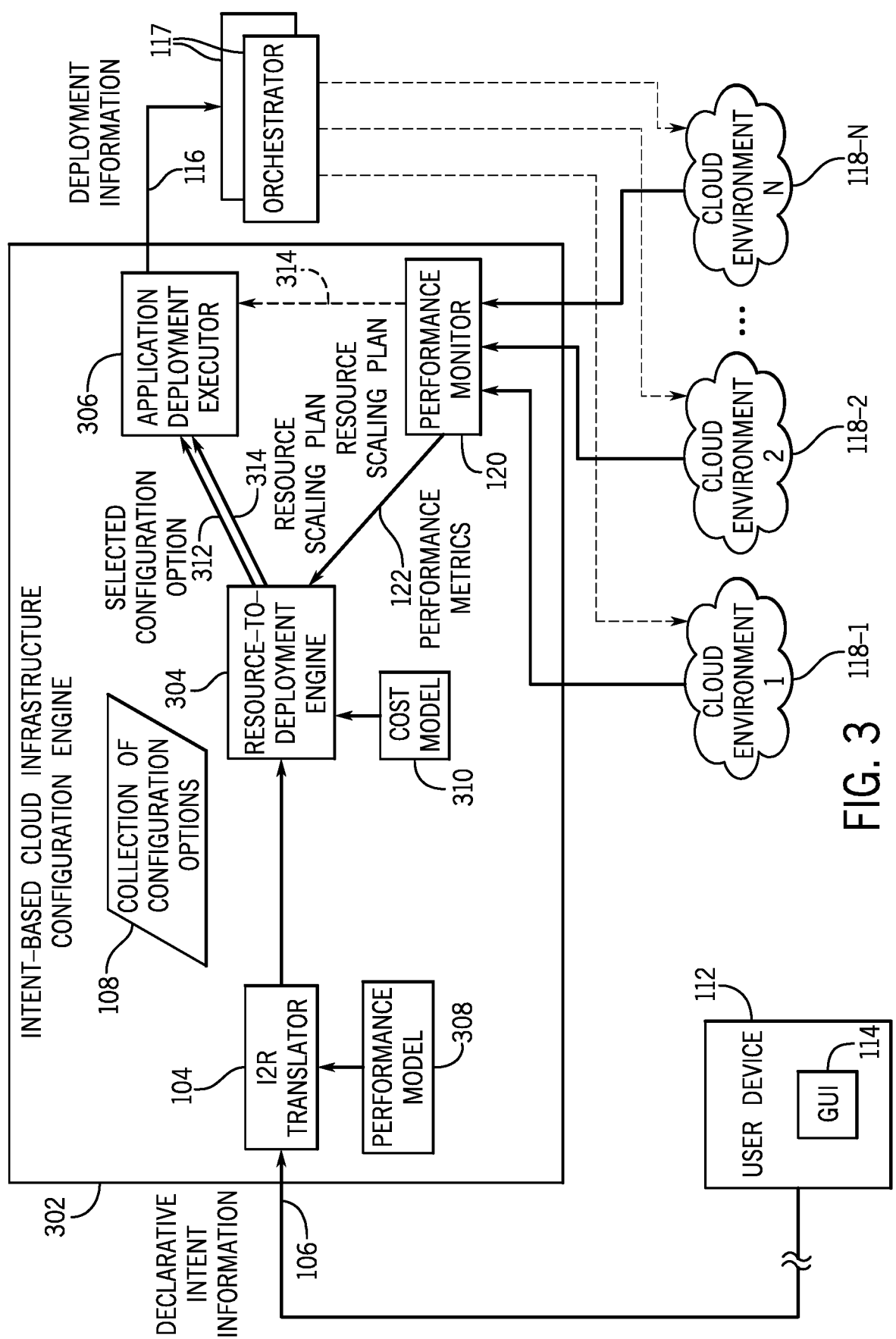
FIG. 3 is a block diagram of an arrangement that includes an intent-based cloud infrastructure configuration engine, according to further examples.

FIG. 3 is a block diagram of an intent-based cloud infrastructure configuration engine 302 according to further examples. The intent-based cloud infrastructure configuration engine 302 includes the I2R translator 104 and the performance monitor 120. However, in the example of FIG. 3, individual components of the CPO 110 are depicted, including a resource-to-deployment engine 304 and an application deployment executor 306.

In addition to the declarative intent information 106, the I2R translator 104 of FIG. 3 also receives information of a performance model 308. The performance model 308 is used to convert the performance specifications included in the declarative intent information 106 to a set of resources. The intent-based cloud infrastructure configuration engine 302 (or another entity) can build the performance model 308 for a respective application using a performance profiling process.

In the performance profiling process, the application can be executed using resources of various configuration options. The configuration options can include some configuration options with a smaller quantity of resources and/or resources of smaller capacity (processing capacity, storage capacity, communication capacity, etc.), and other configuration options with a larger quantity of resources and/or resources of larger capacity. The resources of the various configuration options can be from different combinations of cloud environments.

As the application is executed using the resources of the different configuration options, the entity (e.g., the intent-based cloud infrastructure configuration engine 302) building the performance model 308 can observe performance metrics of the application. The entity can then update the performance model by correlating different sets of resources of corresponding cloud environments to respective different performance levels as represented by the performance metrics.

More generally, the application-specific performance model 308 quantitatively correlates the amount of resources allocated to the application and the respective performance levels of the application. For multiple applications, different performance models 308 can be built and used.

Given performance specifications included in the declarative intent information 106, the I2R translator 104 accesses the performance model 308 for the application to determine the resources to be used for the application or component(s) of the application. Different sets of resources (which are part of different configuration options) can satisfy the performance specifications of the declarative intent information 106. In such cases, the I2R translator 104 can output multiple configuration options as the collection of configuration options 108. Each configuration option of the collection of configuration options 108 includes a set of resources of respective cloud environments, including deployment location that can satisfy the performance specifications of the declarative intent information 106.

The I2R translator 104 provides the collection of configuration options 108 to the resource-to-deployment engine 304. The I2R translator 104 can also provide the performance specifications of the declarative intent information 106 to the resource-to-deployment engine 304.

In addition to receiving the collection of configuration options 108 and the performance specifications, the resource-to-deployment engine 304 also receives as input a cost model 310. The cost model 310 includes cost information obtained from respective cloud environments (e.g., 118-1 to 118-N). Each cloud provider can maintain cost information of resources of a respective cloud environment. Examples of cost information that can be part of the cost model 310 for each cloud environment includes any or some combination of: costs of virtual machines (VMs) of different capacities and types (e.g., in terms of the number processor cores, the memory size, and the operating system), costs of block storage of different capacities (in terms of storage size), costs of input/output (I/O) operations (e.g., cost per 1 million requests), costs of usage of a resource for different time durations, costs of other cloud resources, and so forth.

In some examples, using the cost model 310, the resource-to-deployment engine 304 can compute the cost of the set of resources for the different configuration options of the collection of configuration options 108. The computed cost can be presented to the GUI 114 of the user device 112 along with the associated configuration options, to allow the user of the user device 112 to make a selection from among the configuration options based on the associated costs. For example, the user may select the configuration option with the lowest cost.

In other examples, instead of presenting costs of configuration options to a user, the resource-to-deployment engine 304 can select one of the configuration options based on a target goal, which can be an optimization goal. For example, the resource-to-deployment engine 304 can make a selection from among the configuration options based on an optimization goal that minimizes cost (as derived using the cost model 310) while satisfying the performance specifications of the application. As another example, the resource-to-deployment engine 304 can make a selection from among the configuration options based on another optimization goal that maximizes a performance of the application while satisfying a cost budget for deploying the application.

The resource-to-deployment engine 304 provides the selected configuration option 312 to the application deployment executor 306. Based on the selected configuration option 312, the application deployment executor 306 generates deployment information 116 provided to the orchestrator(s) 117 to deploy the application on the resources of the cloud environments 118-1 to 118-N according to the selected configuration option 312.

The deployment information 116 can be in the form of executable configuration files in cloud-specific languages for the respective cloud environments 118-1 to 118-N. The application deployment executor 306 can generate an executable configuration file for each application component, where the configuration file can include information of a number of instances of the application component to deploy, and the resources (e.g., processing resources, storage resources, communication resources, virtual resources, etc.) allocated to each instance of the application component.

In some examples, the application deployment executor 306 can convert the selected configuration option 312 to cloud-specific detailed executable configuration files in the following manner. First, the application deployment executor 306 converts the selected configuration option 312 to a generic configuration format. The generic configuration format can cover multiple configuration parameters that a cloud environment may use. Next, the application deployment executor 306 converts the generic configuration format to the cloud-specific detailed executable configuration files.

In other examples, other techniques for converting the selected configuration option 312 to cloud-provider-specific detailed executable configuration files can be employed.

The configuration files can be used by the orchestrator(s) 117 to configure and provision the application in the cloud environments 118-1 to 118-N. As new cloud environments may emerge, the intent-based cloud infrastructure configuration engine 302 can provide an extensible interface to support new orchestrators for the new cloud environments. For example, as many orchestrators accept configuration files in the JavaScript Object Notation (JSON) format, the intent-based cloud infrastructure configuration engine 302 can provide an extensible set of application programming interfaces (APIs) to generate different configuration files in the JSON format. For a new cloud environment, a new converter from the generic configuration format to the executable configuration file that is specific to that new cloud environment can be developed and added to the application deployment executor 306.

As discussed above, the performance monitor 120 monitors performance of execution of the application on the cloud environments 118-1 to 118-N, and can produce performance metrics 122 based on the monitoring.

In some examples, the performance metrics 122 can be provided to the resource-to-deployment engine 304, which has an auto-scaling logic to modify an allocation of resources based on comparing the performance metrics 122 to the performance specifications for the application (according to a respective performance policy). In other examples, the performance metrics 122 may be employed by an auto-scaling logic in the performance monitor 120.

If the performance metrics 122 have values indicating that the performance metrics are not being satisfied (according to a performance policy), an action of the performance policy can be triggered. Such action can include the auto-scaling logic in the performance monitor 120 or the resource-to-deployment engine 304 producing a resource scaling plan 314 that includes the a modification of the resources allocated to the application. The resource scaling plan 314 is provided by the auto-scaling logic to the application deployment executor 306, which generates modified deployment information 116 to be used by the orchestrator(s) 117 to deploy the application on modified resources of the cloud environments 118-1 to 118-N.

After the application is deployed and the performance metrics 122 are collected, the performance metrics 122 and the configuration of resources on which the application is deployed can be provided to the I2R translator 104, which can update the performance model 308 accordingly.

To collect performance metrics of an application, drivers, proxies, or agents can be provided in the cloud environments 118-1 to 118-N to collect application-level performance metrics. Alternatively or additionally, an application may include a built-in performance measurement agent that can provide real-time performance metrics. As an example, a driver, proxy, or agent can measure a number of event calls between application components, and the number of event calls can be used to measure various application performance metrics such as throughput and latency. In the example of FIG. 2, a driver, proxy, or agent can be deployed between any two components 208, 210, 212, 214, and 216. For example, to measure the number of images processed per unit time, a driver, proxy, or agent between the query portal 216 and the classification engine 212 can measure the number of event calls (which indicates the number of images processed) between the query portal 216 and the classification engine 212.

Figure 4:
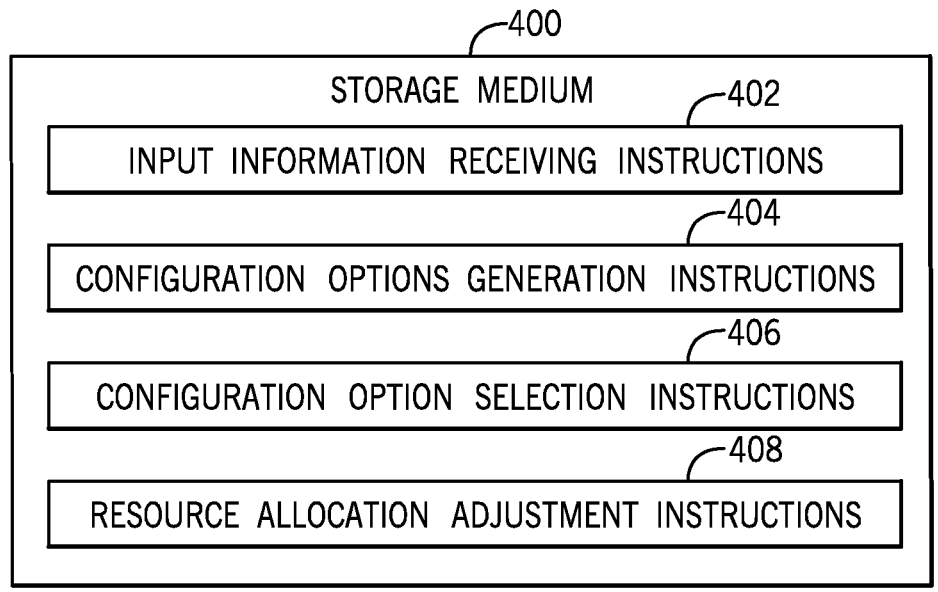
FIG. 4 if a block diagram of a storage medium storing machine-readable instructions according to some examples.

FIG. 4 is a block diagram of a non-transitory machine-readable or computer-readable storage medium 400 storing machine-readable instructions that upon execution cause a system to perform various tasks.

The machine-readable instructions can be part of the intent-based cloud infrastructure configuration engine 102 or 302, for example. The machine-readable instructions include input information receiving instructions 402 to receive input information (e.g., the declarative intent information 106 of FIG. 1 or 3) for an application, the input information including a specification of a performance parameter relating to the application, and information of an arrangement of components of the application.

In some examples, the input information may be received from a user interface (e.g., 114 in FIG. 1) in a declarative language. The performance parameter relating to the application in the input information includes a performance parameter relating to an operation of the application. The input information can further include a specification of another performance parameter relating to network operation for the application.

The machine-readable instructions further include configuration options generation instructions 404 to generate, based on the input specification of the parameter and the information of the arrangement of components of the application, multiple configuration options representing respective different sets of resources, where a first set of resources of the different sets of resources includes resources of different cloud providers. The generation of the multiple configuration options can be automated, such that the multiple configuration options representing respective different sets of resources are generated without manual user input specifying resources of the cloud environments to deploy for the application.

In further examples, a performance model (e.g., 308 in FIG. 3) can be built using a performance profiling process that executes the application using multiple sets of resources. The performance model correlates the multiple sets of resources to corresponding performance levels of the application. The multiple configuration options representing respective different sets of resources can be generated based on the performance model given the specification of the performance parameter relating to the application in the input information The machine-readable instructions further include configuration option selection instructions 406 to select, based on a target goal, a configuration option of the multiple configuration options, and output deployment commands to cause deployment of the selected configuration option.

The machine-readable instructions further include resource allocation adjustment instructions 408 to adjust an allocation of resources to the application responsive to performance metrics from a performance monitor that monitors performance of the application after the deployment. The performance metrics from the performance monitor relate to performance of the application across multiple cloud environments from the different cloud providers.

In some examples, the machine-readable instructions can update the performance model responsive to the performance metrics from the performance monitor that monitors the performance of the application after the deployment.

In further examples, the machine-readable instructions can obtain cost models of costs of resources of the multiple cloud environments, where selecting the configuration option from the multiple configuration options is based on the cost models and the target goal. For example, the target goal can include an optimization goal that minimizes cost while satisfying the performance specifications of the application, or another optimization goal that maximizes a performance of the application while satisfying a cost budget for deploying the application.

Figure 5:
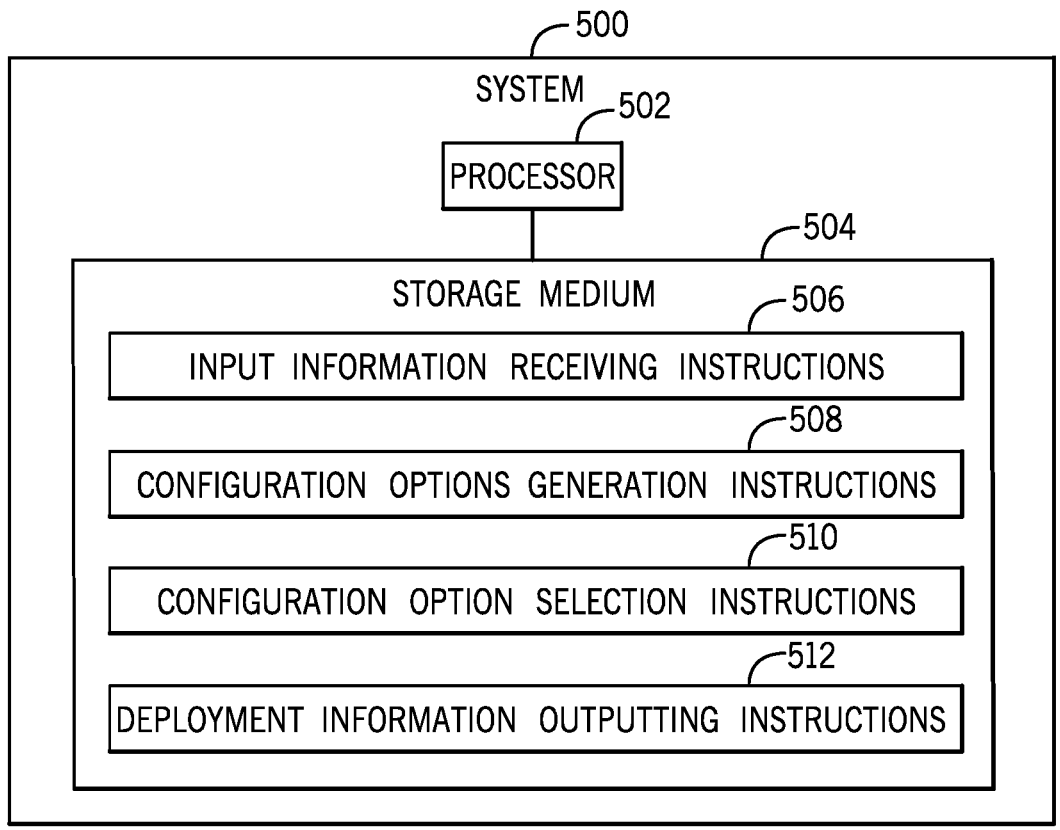
FIG. 5 is a block diagram of a system according to some examples.

FIG. 5 is a block diagram of a system 500 that includes a hardware processor 502 and a storage medium 504 that stores machine-readable instructions executable on the hardware processor 502 to perform respective tasks.

A hardware processor can include a microprocessor, a core of a multi-core microprocessor, a microcontroller, a programmable integrated circuit, a programmable gate array, a digital signal processor, or another hardware processing circuit.

Machine-readable instructions executable on a hardware processor can refer to the instructions executable on a single hardware processor or the instructions executable on multiple hardware processors.

The machine-readable instructions include input information receiving instructions 506 to receive, from a user interface, input information for an application, the input information including a specification of a first performance parameter relating to an operation of the application, a specification of a second performance parameter relating to network operation for the application, and information of an arrangement of components of the application.

The machine-readable instructions further include configuration options generation instructions 508 to generate, based on the input information, a plurality of configuration options representing respective different sets of resources, where a first set of resources of the different sets of resources includes resources of a plurality of cloud environments from different cloud providers.

The machine-readable instructions further include configuration option selection instructions 510 to select, based on a target goal, a configuration option of the plurality of configuration options.

The machine-readable instructions further include deployment information outputting instructions 512 to output deployment information to cause deployment of the selected configuration option.

Figure 6:
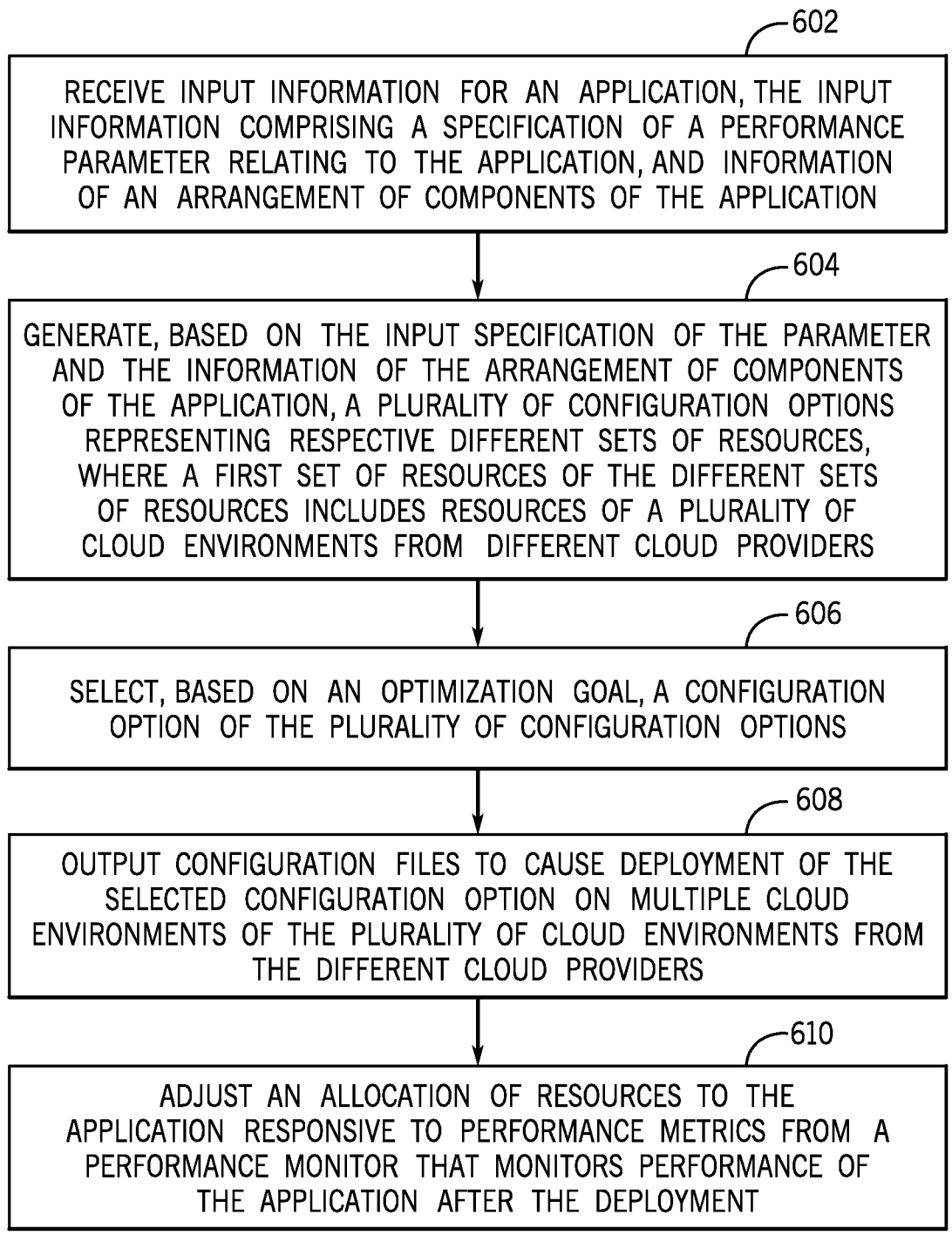
FIG. 6 is a flow diagram of a process according to some examples.

FIG. 6 is a flow diagram of a process according to some examples, which can be performed by the intent-based cloud infrastructure configuration engine 102 or 302. The process includes receiving (at 602) input information for an application, the input information comprising a specification of a performance parameter relating to the application, and information of an arrangement of components of the application.

The process includes generating (at 604), based on the input specification of the parameter and the information of the arrangement of components of the application, a plurality of configuration options representing respective different sets of resources, where a first set of resources of the different sets of resources includes resources of a plurality of cloud environments from different cloud providers.

The process includes selecting (at 606), based on an optimization goal, a configuration option of the plurality of configuration options. The process includes outputting (at 608) configuration files to cause deployment of the selected configuration option on multiple cloud environments of the plurality of cloud environments from the different cloud providers.

The process includes adjusting (at 610) an allocation of resources to the application responsive to performance metrics from a performance monitor that monitors performance of the application after the deployment.

A storage medium (e.g., the storage medium 400 of FIG. 4 or 504 of FIG. 5) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disc (CD) or a digital video disc (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a system to:
   receive input information for an application to be deployed across one or more cloud environments of a plurality of cloud environments from different cloud providers, the input information comprising a specification of a performance parameter relating to the application, and information of an arrangement of components of the application, wherein the input information is not required to specify resources of the plurality of cloud environments;
   generate, based on the specification of the performance parameter and the information of the arrangement of components of the application, a plurality of configuration options representing respective different sets of resources, wherein a first set of resources of the different sets of resources includes resources from among each of the plurality of cloud environments;
   select, based on a target goal, a configuration option of the plurality of configuration options, and output deployment information to cause deployment of the selected configuration option; and
   adjust an allocation of resources to the application responsive to performance metrics from a performance monitor that monitors performance of the application after the deployment.

2. The non-transitory machine-readable storage medium of claim 1, wherein the performance parameter relating to the application in the input information comprises a first performance parameter relating to operation of the application, and the input information further comprises a specification of a second performance parameter relating to network operation for the application.

3. The non-transitory machine-readable storage medium of claim 1, wherein the specification of the performance parameter relating to the application, and the information of the arrangement of components of the application are received through a user interface in a declarative language.

4. The non-transitory machine-readable storage medium of claim 1, wherein the instructions upon execution cause the system to:
   build a performance model using a performance profiling process that executes the application using multiple sets of resources, the performance model correlating the multiple sets of resources to corresponding performance levels of the application,
   wherein generating the plurality of configuration options representing respective different sets of resources is based on the performance model given the specification of the performance parameter relating to the application in the input information.

5. The non-transitory machine-readable storage medium of claim 4, wherein the instructions upon execution cause the system to:
update the performance model responsive to the performance metrics from the performance monitor that monitors the performance of the application after the deployment.

6. The non-transitory machine-readable storage medium of claim 1, wherein the instructions upon execution cause the system to:
obtain cost models of costs of resources of the plurality of cloud environments,
wherein selecting the configuration option of the plurality of configuration options is based on the cost models and the target goal.

7. The non-transitory machine-readable storage medium of claim 6, wherein the target goal comprises an optimization goal to maximize a performance of the application or to minimize a cost of resources for the deployment of the application.

8. The non-transitory machine-readable storage medium of claim 1, wherein the instructions upon execution cause the system to:
generate an auto-scaling plan based on the performance metrics to adjust an allocation of resources to the application.

9. The non-transitory machine-readable storage medium of claim 8, wherein the instructions upon execution cause the system to:
generate modified deployment information based on the auto-scaling plan.

10. The non-transitory machine-readable storage medium of claim 1, wherein the performance metrics from the performance monitor relate to performance of the application across multiple cloud environments of the plurality of cloud environments from the different cloud providers.

11. The non-transitory machine-readable storage medium of claim 1, wherein the deployment information comprise executable configuration files for deploying the application across multiple cloud environments of the plurality of cloud environments.

12. The non-transitory machine-readable storage medium of claim 1, wherein the instructions upon execution cause the system to:
produce a performance policy and store the performance policy in a declarative database; and
trigger an action of the performance policy responsive to the performance metrics satisfying a rule of the performance policy, the triggered action comprising the adjustment of the allocation of resources.

13. A system comprising:
a processor; and
a non-transitory storage medium storing instructions executable on the processor to:
receive, from a user interface, input information for an application to be deployed across one or more cloud environments of a plurality of cloud environments from different cloud providers, the input information comprising a specification of a first performance parameter relating to an operation of the application, a specification of a second performance parameter relating to network operation for the application, and information of an arrangement of components of the application, wherein the input information is not required to specify resources of the plurality of cloud environments;
generate, based on the input information, a plurality of configuration options representing respective different sets of resources, wherein a first set of resources of the different sets of resources includes resources from among each of the plurality of cloud environments;
select, based on a target goal, a configuration option of the plurality of configuration options; and
output deployment information to cause deployment of the selected configuration option.

14. The system of claim 13, wherein the instructions are executable on the processor to:
receive, from a performance monitor that monitors performance of the application after the deployment, performance metrics relating to the application after the deployment; and
adjust an allocation of resources to the application responsive to performance metrics from the performance monitor.

15. The system of claim 13, wherein the instructions are executable on the processor to send the deployment information to an orchestrator for a cloud environment that includes resources of the selected configuration option.

16. The system of claim 13, wherein the instructions are executable on the processor to:
build a performance model using a performance profiling process that executes the application using multiple sets of resources, the performance model correlating the multiple sets of resources to corresponding performance metrics of the application,
wherein the generating of the plurality of configuration options representing respective different sets of resources is based on the performance model given the specification of the performance parameter relating to the application in the input information.

17. The system of claim 16, wherein the instructions are executable on the processor to:
receive, from a performance monitor that monitors performance of the application after the deployment, performance metrics relating to the application after the deployment; and
update the performance model based on the performance metrics.

18. A method executed by a system comprising a hardware processor, comprising:
receiving input information for an application to be deployed across one or more cloud environments of a plurality of cloud environments from different cloud providers, the input information comprising a specification of a performance parameter relating to the application, and information of an arrangement of components of the application;
generating, based on the specification of the performance parameter and the information of the arrangement of components of the application, a plurality of configuration options representing respective different sets of resources, wherein a first set of resources of the different sets of resources includes resources from among the plurality of cloud environments;
selecting, based on an optimization goal, a configuration option of the plurality of configuration options;
outputting configuration files to cause deployment of the selected configuration option on multiple cloud environments of the plurality of cloud environments from the different cloud providers; and adjusting an allocation of resources to the application responsive to performance metrics from a performance monitor that monitors performance of the application after the deployment.

19. The method of claim 18, further comprising:
building a performance model using a performance profiling process that executes the application using multiple sets of resources, the performance model correlating the multiple sets of resources to corresponding performance metrics of the application,
wherein the generating of the plurality of configuration options representing respective different sets of resources is based on the performance model given the specification of the performance parameter relating to the application in the input information.

20. The non-transitory machine-readable storage medium claim 1, wherein input information for the application is in a form of a text document.

\* \* \* \* \*